(12) United States Patent
Jones

(10) Patent No.: US 7,125,054 B2
(45) Date of Patent: *Oct. 24, 2006

(54) SELF RESTRAINING GASKET AND PIPE JOINT

(75) Inventor: Jim Jones, Aledo, TX (US)

(73) Assignee: S & B Technical Products, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/952,137

(22) Filed: Sep. 28, 2004

(65) Prior Publication Data

US 2005/0040645 A1 Feb. 24, 2005

Related U.S. Application Data

(63) Continuation-in-part of application No. 10/670,651, filed on Sep. 24, 2003, now Pat. No. 6,945,570, which is a continuation-in-part of application No. 10/657,408, filed on Sep. 8, 2003, now Pat. No. 6,974,160, which is a continuation-in-part of application No. 10/440,809, filed on May 19, 2003, now abandoned.

(51) Int. Cl.
*F16L 19/08* (2006.01)

(52) U.S. Cl. .................. 285/337; 285/104; 285/339; 285/374; 285/421; 285/910

(58) Field of Classification Search ............. 285/337, 285/339, 341, 342, 343, 374, 104, 105, 910, 285/421
See application file for complete search history.

(56) References Cited

U.S. PATENT DOCUMENTS

| | | | | |
|---|---|---|---|---|
| 2,585,453 A | * | 2/1952 | Gallagher et al. ........... | 285/341 |
| 3,381,983 A | * | 5/1968 | Hanes ........................ | 285/321 |
| 3,724,880 A | * | 4/1973 | Seiler ......................... | 285/105 |
| 3,963,298 A | * | 6/1976 | Seiler ......................... | 277/625 |
| 4,092,036 A | * | 5/1978 | Sato et al. ................... | 285/337 |
| 4,229,026 A | * | 10/1980 | Seiler ......................... | 285/105 |
| 4,799,717 A | * | 1/1989 | Kingsford .................... | 285/341 |
| 4,848,805 A | * | 7/1989 | Bucher et al. .............. | 285/105 |
| 4,867,488 A | * | 9/1989 | Jones ........................ | 285/328 |
| 4,878,698 A | * | 11/1989 | Gilchrist ..................... | 285/342 |
| 4,886,304 A | * | 12/1989 | Kunsman .................... | 285/104 |
| 5,037,144 A | * | 8/1991 | Peting et al. ............... | 285/321 |

(Continued)

FOREIGN PATENT DOCUMENTS

GB 2272264 A * 5/1994

*Primary Examiner*—James M. Hewitt
(74) *Attorney, Agent, or Firm*—Charles D. Gunter, Jr.

(57) ABSTRACT

A sealing and restraining gasket for preventing separation of a pipe joint used to join a bell end of a female pipe to the male end of a mating pipe. The gasket is formed from a compressible body of elastomeric material and carries a rigid ring with gripping teeth for engaging an outer surface of the mating male pipe. The ring has a gap at one location. The gripping teeth of the rigid ring are oriented so as to be out of contact with and initially angled away from the outer surface of the male plastic pipe. The teeth are forced into engagement with the exterior surface of the male pipe as the pipe joint is assembled and the gap in the ring is partly closed. The teeth are oriented to allow movement of the male pipe in a first direction relative to the female bell end opening during assembly, but to resist movement in a opposite direction after the pipe joint has been assembled.

15 Claims, 4 Drawing Sheets

U.S. PATENT DOCUMENTS

| | | | |
|---|---|---|---|
| 5,067,751 A * | 11/1991 | Walworth et al. | 285/105 |
| 5,197,768 A * | 3/1993 | Conner | 285/105 |
| 5,205,356 A * | 4/1993 | Bridges et al. | 166/85.1 |
| 5,205,594 A * | 4/1993 | Stoll et al. | 285/322 |
| 5,269,569 A * | 12/1993 | Weber et al. | 285/104 |
| 5,295,697 A * | 3/1994 | Weber et al. | 277/616 |
| 5,297,826 A * | 3/1994 | Percebois et al. | 285/232 |
| 5,335,946 A * | 8/1994 | Dent et al. | 285/243 |
| 5,360,218 A * | 11/1994 | Percebois et al. | 277/619 |
| 5,398,980 A * | 3/1995 | Hunter et al. | 285/337 |
| 5,431,453 A * | 7/1995 | Yamashita et al. | 285/93 |
| 5,464,228 A * | 11/1995 | Weber et al. | 277/615 |
| 5,476,290 A * | 12/1995 | Bergmann et al. | 285/110 |
| 5,779,285 A * | 7/1998 | Robison | 285/337 |
| 5,803,513 A * | 9/1998 | Richardson | 285/342 |
| 5,951,058 A * | 9/1999 | Dickinson et al. | 285/21.2 |
| 6,220,635 B1 * | 4/2001 | Vitel et al. | 285/337 |
| 6,371,530 B1 * | 4/2002 | Sato et al. | 285/337 |
| 6,371,531 B1 * | 4/2002 | Robison | 285/342 |
| 6,467,813 B1 * | 10/2002 | Takemura et al. | 285/114 |
| 6,488,319 B1 * | 12/2002 | Jones | 285/374 |
| 6,502,867 B1 * | 1/2003 | Holmes et al. | 285/337 |
| 6,505,860 B1 * | 1/2003 | Trichard | 285/104 |
| 6,688,652 B1 * | 2/2004 | Holmes et al. | 285/105 |
| 2001/0045746 A1 * | 11/2001 | Russell | 285/105 |
| 2002/0163193 A1 * | 11/2002 | Abuellel | 285/337 |
| 2003/0025329 A1 * | 2/2003 | Saito et al. | 285/337 |
| 2004/0075217 A1 * | 4/2004 | Copeland | 277/314 |
| 2005/0046189 A1 * | 3/2005 | Corbett et al. | 285/374 |

* cited by examiner

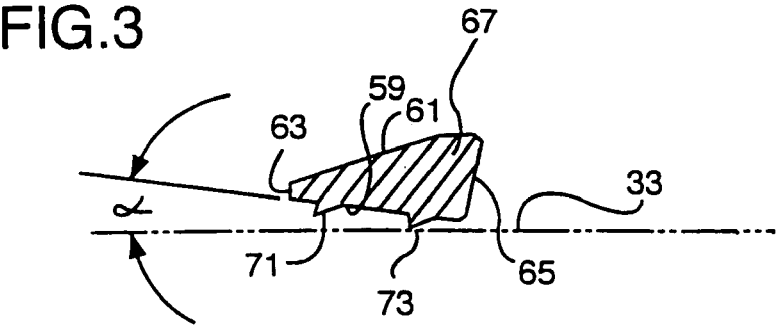
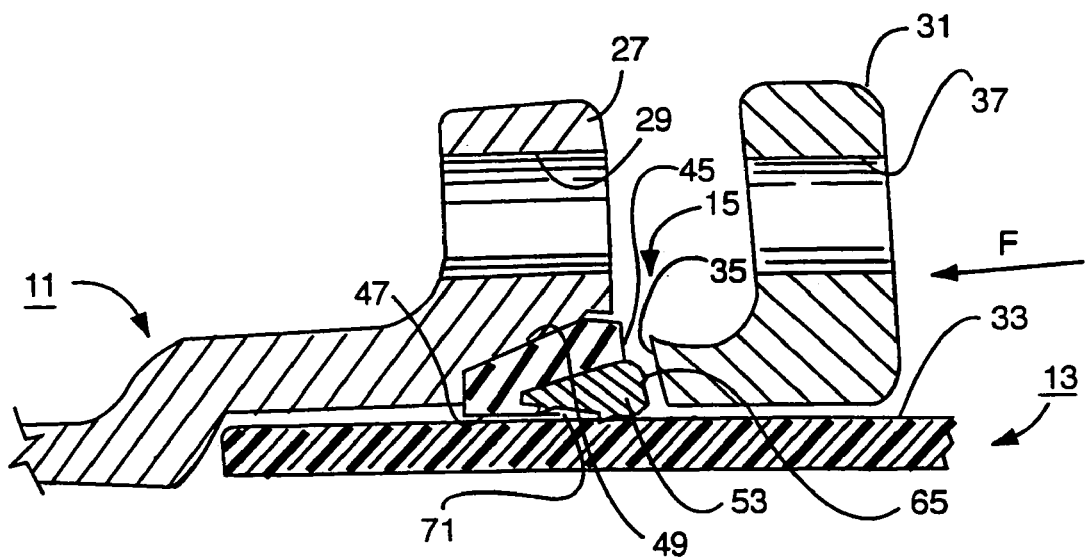
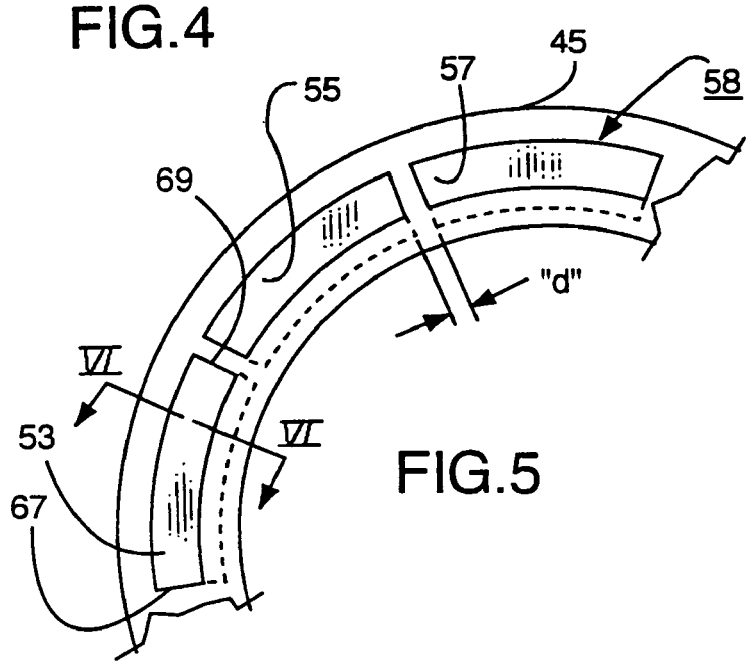

SELF RESTRAINING GASKET AND PIPE JOINT

CROSS-REFERENCE TO RELATED APPLICATIONS

The present application is a continuation-in-part of earlier filed application Ser. No. 10/670,651, filed Sep. 24, 2003, now U.S. Pat. No. 6,945,570, issued Sep. 20, 2005, which was a continuation-in-part of Ser. No. 10/657,408, filed Sep. 8, 2003, now U.S. Pat. No. 6,974,160, issued Dec. 13, 2005, which in turn was a continuation-in-part of earlier filed application U.S. Ser. No. 10/440,809, filed May 19, 2003, now abandoned.

BACKGROUND OF THE INVENTION

1. Field of the Invention

The present invention relates generally to the field of pipe connections and to devices used in the pipeline construction industry. More particularly, this invention relates to devices used to join the ends of pipe in which a self-restraining pressure gasket is employed.

2. Description of the Prior Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC.

In many applications where pipes are joined in telescoping relationship, the spigot end of one pipe is inserted into the socket end of the engaging pipe. The socket end has an opening large enough to receive the spigot end of the mating pipe. Often times, the materials being transported are fluid or gaseous in nature, and, particularly in those circumstances, it is desired that the pipeline be impervious to leaks. In order to accomplish that goal, and to achieve other objectives which will be herein described, those skilled in the business of pipe and pipeline construction are constantly in search of improved means for securing the joints formed by connecting the ends of pipe together. There are numerous methods currently in use by those in the pipe and pipeline construction industry to obtain a secure joint. These methods employ different types of components and also can be distinguished by the various ways in which such components are employed. The selection of these different methods will usually depend on the overall design requirements of the pipeline. In any event, a gasket is typically present within the socket end of the pipe which is intended to prevent leakage of fluid from the joint by forming a seal between the two pipe sections. This method is commonly used in plastic pipelines.

In addition to the necessity of providing an effective seal at the pipe joint, another important design requirement exists when it becomes necessary to join the pipe components in a restrained manner. This is usually desired in order to prevent the pipe components from separating due to thrust forces that often occur when the pipeline is subjected to internal pressure, and sometimes, when earth tremors or other external factors come into play.

In the case of iron pipelines, the devices for joining pipe have included the use of flanged fittings which are of appropriate diameter and which are fitted onto pipe ends in facing relationship to one another. A gasket or "gland" is usually employed between the faces of the flanged fittings to obtain a sealed joint. The flanged fittings are typically secured by bolting the flanged fittings together. In the case of iron pipe, set screws are sometimes inserted radially through the collar of the flange into the exterior surface of the pipe ends in order to secure the flanged fitting to the pipe ends.

One commercial sealing system which is known in the iron pipe industry and which utilizes a gland and flanged fittings is referred to as a "mechanical joint" or simply as an "MJ". The bell end of an iron pipe section has a flanged portion cast on it and receives the elastomeric gasket or gland. The spigot end of a second iron pipe is fitted with a slidable gland fitting. The gland fitting has a plurality of apertures for receiving standard bolts. The joint is formed when the spigot is axially inserted into the bell, and the gland fitting and the flanged portion are bolted together, causing the lip of the gland fitting to compress the elastomeric gasket or gland, thus sealing the two pipe pieces. The elastomeric gasket or gland had no teeth, gripping or self-restraining feature.

Additionally, no exact counterpart to the iron pipe mechanical joint (MJ) presently exists in the marketplace for joining the bell end of an iron pipe section or fitting to the spigot end of a plastic pipe. Such joints are increasingly commonplace as plastic pipe components are used to replace or rehabilitate existing iron pipelines.

It is a generally required practice during installation of plastic pipelines, in, for example, municipal installations, that the pipejoints be restrained to accommodate varying pressures. There are various types of connections which are commercially available and which are used in the waterworks industry for restraining plastic pipelines. Each of these traditional restraining mechanisms adds considerable cost to the pipe installation as well as adding the possibility of human error depending on the specific conditions and applications. Most current restraining systems for plastic pipe systems offered in the industry require a substantial amount of labor to install. Under most installation conditions, the restraining systems are cumbersome to install and represent a substantial additional effort for the contractor. These type systems are not intended to be used with iron pipes having a flanged bell and an associated gland and slidable gland fitting of the MJ type design.

U.S. Pat. No. 6,488,319, issued Dec. 3, 2002, to Jones, shows a method and apparatus for restraining plastic pipe against internal forces at a connection and to join and seal at least two pipes to form a pipeline where the pipes in question are plastic pipes as opposed to iron pipes. A self-restrained pressure gasket is utilized as a part of the design. The gasket has a continuous rigid ring formed as an integral part of the gasket. The rigid ring which forms the restraining mechanism has rows of teeth of varying lengths that, when assembled, engage at various points around the circumference of a mating pipe. The teeth adjust to the tolerances allowed in pipe manufacturing without losing gripping capacity.

Although the Jones patent represented an advance in the art, it was not intended to represent a mechanical joint for plastic pipe in the same way that the MJ designs have been used in the industry for iron pipe in the past. In other words, the female pipe end in the Jones patent was a typical belled plastic pipe end. There was no flanged cast portion on the female bell pipe end and no slidable gland fitting on the male, spigot pipe end in the sense of the traditional MJ design.

Accordingly, a needs continues to exist for improved self-restraining and sealing systems for pipelines utilizing iron and plastic components which system offer the advantages of a mechanical joint type sealing system.

A need also exists for such a system which is cost-effective, easy to manufacture and easy to use in the field and which is extremely dependable in operation.

A need also exists for such a system which effectively restrains fluid conveying pipes against internal and external forces at a pipe or fitting connection and which effectively joins and seals at least two pipes to form a pipeline.

SUMMARY OF THE INVENTION

The self-restrained pressure gasket of the invention is intended to be inserted within a recess provided in a bell end opening of a first pipe section or fitting and is capable of both joining and sealing the first pipe section to a mating male plastic pipe having an interior surface and an exterior surface. The gasket is formed with an annular gasket body made of a resilient elastomeric material and has an inner circumferential region and an outer circumferential region. A hardened ring which is preferably formed either as a solid ring with one circumferential opening or as a plurality of hardened ring segments is located on the inner circumferential region of the gasket body. The hardened ring (or at least selected ones of the ring segments where a segmented ring is used) has an inner circumferential surface, an outer circumferential surface and at least one row of teeth located on the inner circumferential surface for engaging selected points on the exterior surface of the mating male plastic pipe. The teeth located on the ring inner circumferential surface initially form an acute angle with respect to the exterior surface of the mating male pipe section. Preferably, a plurality of rows of teeth are located on the ring inner circumferential surface. The acute angle which is formed between the teeth located on the ring inner circumferential surface is in the range from about 5 to 20 degrees, the angle being selected so that the teeth do not initially engage or bite into the exterior surface of the mating male pipe until the slidable gland fitting is bolted into position to form the sealed and restrained joint or connection.

The mating plastic pipe is inserted into the bell end opening of the female pipe section with the male and female pipes being aligned along a central axis with at least selected teeth of the hardened ring being initially angled away from the outer surface of the male plastic pipe. The teeth of the hardened ring are forced into engagement with the exterior surface of the male plastic pipe as the pipe joint is assembled by means of the force applied to a rear face of the hardened ring by the slidable gland fitting. This force causes the teeth to be forced downwardly in the direction of the exterior surface of the mating male pipe so that the teeth grip the exterior pipe surface. The teeth are oriented to allow movement of the male pipe in a first direction relative to the female bell end opening during the assembly process but to resist movement in a opposite direction once the pipe joint is made up.

Also, the ring and ring teeth are selectively positioned with respect to the remaining surfaces of the gland body so that the gland sealing surfaces first make contract and form a fluid tight seal, followed by engagement of the gripping teeth with the male pipe exterior surface. In the preferred embodiment of the invention, the hardened ring is made in one piece with only a single slit along the circumference thereof to allow for expansion and contraction. In this case, the ring preferably rests within a pocket formed in the rubber inner circumferential region of the gasket body, thereby allowing some expansion and contraction of the ring, for example, to allow the gasket to slip over the male pipe end.

Additional objects, features and advantages will be apparent in the written description which follows.

BRIEF DESCRIPTION OF THE DRAWINGS

FIG. 3 is an isolated, cross sectional view of one of the hardened ring segments used in the self-restraining gasket of the present invention.

FIG. 4 is another horizontal, quarter sectional view of the pipe joint of the invention showing the assembly of the slidable gland fitting which is used to make up the joint and with the gland fitting spaced slightly apart from the self-restraining gasket for ease of illustration.

FIG. 5 is a quarter sectional plan view of the layout of one embodiment of the gripping segments in the self-restraining gasket of the invention showing the gap between the respective gripping segments.

DETAILED DESCRIPTION OF THE INVENTION

Figure 1:
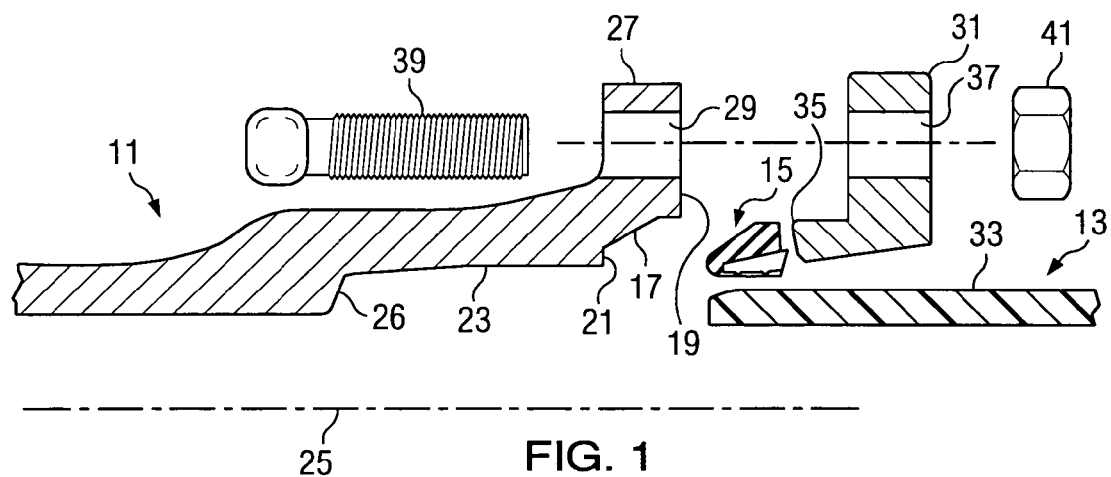
FIG. 1 is a horizontal, quarter sectional view of a pipe joint of the invention, the joint being shown in exploded fashion for ease of illustration.

It is well known in the art to extrude plastic pipes in an elongated cylindrical configuration of a desired diameter and to then cut the extruded product into individual lengths of convenient size suitable for handling, shipping and installing. By "plastic" is meant a section of pipe formed from a convenient polyolefin or polyolefin derivative such as polypropylene, polyethylene or polyvinylchloride (PVC). A preferred plastic material for the water works industry is PVC. In a typical water or sewer installation of the prior art, each length of pipe is enlarged or "belled" at one end sufficiently to join the next adjacent pipe section by receiving in the belled end the unenlarged or "spigot" end of the next adjacent length of pipe within the bell end opening. The inside diameter of the bell is formed sufficiently large to receive the spigot end of the next section of pipe with sufficient clearance to allow the application of an elastomeric gasket or other sealing device designed to prevent leakage at pipe joints when a plurality of pipe lengths are joined to form a pipeline.

Plastic pipes of the above type have, for many years, been joined by utilizing an elastomeric gasket which is compressed between the inside walls of the bell and the outside wall of the plain or beveled end of the spigot end of the next pipe in a series of telescoped pipes. The gasket is typically retained within a groove provided in the bell end opening of the female pipe section. One problem which exists, however, is finding a way to "restrain" the assembled pipe joint so that the joint will not separate due to internal or external pressure, or due to environmental factors such as earth movement. Another problem exists in joining sections of plastic pipe to iron pipe bells or iron pipe fittings which may already be in place in some geographic locations, particularly in the case of older sewer or water lines.

As mentioned in the background discussion of the invention, the iron pipe industry has addressed the problem of providing a restrained pipe joint by utilizing a sealing "gland" and fitting, sometimes referred to as a "mechanical joint" or simply as an "MJ". The bell end of an iron pipe section has a flanged portion cast on it. The spigot end of a second iron pipe is fitted with a slidable gland fitting and a gasket that is conically shaped in cross section. The conically shaped gasket is positioned between the gland fitting and the spigot end of the pipe. The slidable gland fitting has a plurality of apertures for receiving standard bolts. The joint is formed when the spigot is axially inserted into the bell, and the gland fitting and the flanged portion are bolted together, causing the lip of the gland fitting to compress the gasket thus sealing the two sections of pipe.

While such restraint assemblies have existed in the past for iron pipe systems, no such system has existed for joining a male, plastic pipe section to a female or bell iron pipe section or fitting.

One object of the present invention is to provide an improved self-restraining gasket which can be used in a variety of sealing situations. In a particularly preferred form of the invention, the gasket of the invention is used to make up a mechanical joint for joining a male plastic pipe to a female iron pipe, thereby forming a restrained joint of the type previously available only in cast iron pipe joints.

Because of the different materials of plastic pipe systems and cast iron pipe systems, the sealing components utilized must be designed differently. The restraining mechanism employed will differ in the plastic pipe system, primarily due to the fact that the plastic pipe can be "scored" or crushed by the restraining mechanism if improper stresses are exerted during the joint assembly or during use. This is not generally a problem in the case of cast iron pipe, because of the difference in the material making up the pipe itself.

In the embodiment of the invention illustrated in FIG. 1, there is shown a joint is to be formed between a pipe bell end 11 of one iron pipe and plain spigot end 13 of a second plastic pipe. The second pipe 13 is to be inserted into the belled end 11 of the enclosing pipe. The gasket 15 of the present invention is shown in exploded fashion with the other components of the pipe joint in FIG. 1.

Figure 2:
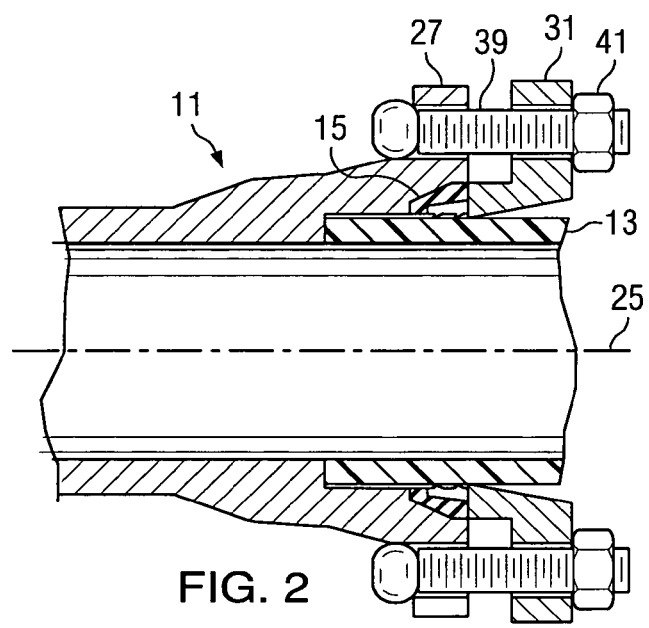
FIG. 2 is a full horizontal section of the pipe joint of the invention, with the joint being shown in the assembled condition.

The inner surface of the pipe bell end 11 has a circumferential recess 17 for retaining the gasket 15. The recess 17 is bounded by a front wall 19 and by a retainer wall 21. In addition, the bell pipe end has a throat region 23 which extends longitudinally inwardly parallel to the pipe axis 25 and joins a shoulder region 26. The bell pipe end 11 also has a flanged collar region 27 which includes a plurality of apertures 29. A circumferential, slidable gland fitting 31, also of iron, is sized to be received about an outer surface 33 of the mating male plastic pipe 13. The slidable gland fitting 31 has a forward lip region 35 which contacts and compresses the body of the gasket 15 as the joint is assembled (see FIG. 2). The slidable gland fitting 31 also has a plurality of apertures 37 (FIG. 1) which are arranged to be aligned with the apertures in the flange collar region 27 of the bell end. A bolting means such as bolts 39 and nuts 41 are used to join the apertures of the bell pipe end and the slidable gland fitting as shown in FIG. 2.

As shown in FIGS. 3–5, the self-restrained pressure gasket 15 includes an annular gasket body 45 made of a resilient elastomeric material, such as a suitable natural or synthetic rubber. The annular gasket body 45 has an inner circumferential region 47 and a sloping outer circumferential region 49. The gasket body 45 is generally cone shaped, as view in cross section in FIG. 4.

Figure 8:
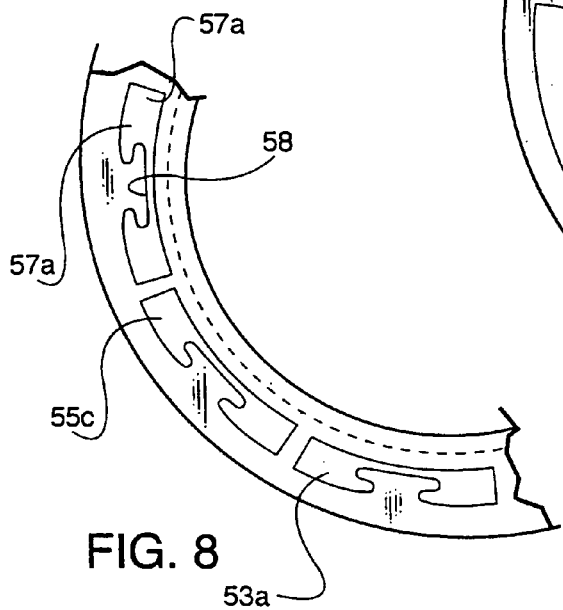
FIG. 8 is a view similar to FIGS. 5 and 7, but showing another embodiment of the hardened ring segments in which the segments are retained in position within the rubber body of the gasket by means of dovetail regions formed in the segments.

In one embodiment of the invention, a segmented ring (generally at 58 in FIG. 5) formed of a plurality of hardened ring segments (53, 55, 57 shown) is present within the gasket body. Each segment 57 can be integrally molded within the material of the gasket body 45 so that the ring segments 53 are at least partially embedded or enclosed within the resilient elastomeric material. The ring segments are preferably either bonded to the rubber of the gasket body during the curing or manufacturing process, or are held in place by a suitable adhesive or by other mechanical means. Alternatively, a suitably shaped groove or pocket can be formed on the inner circumference of the gasket body to retain the ring segments. FIG. 8 shows a plurality of ring segments 53a, 55a, 57a, all which have dovetail regions 58 for mechanically restraining the ring segments within the gasket body.

Figure 6:
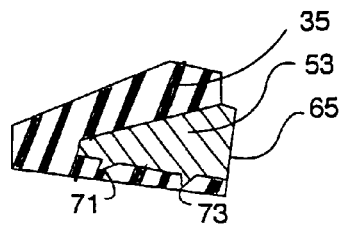
FIG. 6 is an isolated, cross sectional view of the self-restraining gasket of FIG. 5, taken along lines VI—VI.

Each of the ring segments 53, is shown in FIG. 3, has an inner circumferential surface 59, and outer circumferential surface 61, front and rear end faces 63, 65 and opposing sides 67, 69. At least one row of teeth 71 are located on the inner circumferential surface 59 of at least selected ones of the ring segments 53 for engaging selected points on the exterior surface 33 of the mating male plastic pipe 13. In the preferred embodiment illustrated in FIG. 3, the ring segments 53 have two parallel rows 71, 73 of teeth located on the inner circumferential surface 59 of at least selected ones of the ring segments. The rows of teeth 71, 73 may be completely encapsulated within the elastomeric material of the gasket 45 or may be partially or wholly exposed therefrom. FIG. 6 shows one embodiment of the invention in which the teeth 71, 73 are initially covered by the rubber material of the gasket body. As shown in FIG. 6, the rear end face 65 of the segment 53 protrudes slightly from the resilient elastomeric material 35 of the gasket body in the embodiment illustrated The ring segments 53 can be formed of a suitable metal or alloy such as copper, aluminum or stainless steel as well as various hardened polymers, ceramics, composite materials, and the like. Since the slidable gland fitting 31 contacts the ring segments and forms a positive stop for the joint, almost any hard material can be used to form the gripping ring segments 53. Also, the number of rows of teeth and the number of teeth in each row can vary according to the particular end application for the sealing gasket. The rows of teeth on each ring segment can also contain teeth of uneven length which may be spaced evenly or unevenly across the inner circumferential surface 59 thereof.

As illustrated in the embodiment of the invention shown in FIGS. 3 and 4, the ring segments 53 are located within the annular gasket body 45 with the inner circumferential region 59 thereof forming an acute angle a with respect to the exterior surface 33 of the mating male pipe section (illustrated by phantom lines in FIG. 3), or to the pipe axis 25. In the preferred embodiment illustrated, the acute angle a is in the range from about 5° to 20°, most preferably about 7° to 10°. As the gland fitting contacts the gasket, the fitting lip region (35 in FIG. 4) and the gasket rear end face 65 will form mating surfaces.

Because of the orientation of the ring segments 53 within the gasket body, the rows of teeth 71, 73 do not engage and grip the pipe exterior surface 33 until the joint is assembled. In other words, some compression of the gasket body 45 is necessary before the teeth 71, 73 are forced to rotate downwardly in the direction of the top arrow over the angle a shown in FIG. 3 and therefore in the direction of the pipe exterior 33. With reference to FIG. 4, as the gland fitting 31 is moved in the direction of the flange collar region 27 of the bell pipe end, the lip region 35 of the gland fitting contacts the rear end face 65 of the segment 53 causing the teeth 71, 73 to be rotated downwardly in the direction of the pipe exterior surface 33. This action causes the rows of teeth 71, 73 to actually bite into the exterior surface of the mating male pipe section 33. Note that in FIG. 4, the gland fitting 31 is shown slightly spaced apart from the flanged collar region 27 for ease of illustration. The ring segment 53 is shown rotated downwardly to contact the male pipe exterior surface 33 as it would be during the initial stage of contact by the gland fitting 31.

As illustrated in FIG. 5, the ring segments (53, 55, 57, illustrated) completely circumscribe the gasket with only a slight gap or distance (illustrated as "d" in FIG. 5) between the ring segments. Thus, each of the segments is separated by the gap "d" when the gasket is in the relaxed state shown in FIG. 5. When the joint is assembled, the gaps close up, allowing near or complete 360° contact of the gripping segments about the periphery of the gasket. This contact prevents the hoop stress that might otherwise cause shearing or damage to the male pipe section as the gripping teeth bite into the exterior surface 33 of the male pipe section. Hoop stress is the stress in a pipe wall acting circumferentially in a plane perpendicular to the longitudinal axis of the pipe and produced by the pressure of the fluid in the pipe. Hoop stress is calculated as follows:

$S=PD/2t$, where

S=hoop stress, in psi
P=internal pressure
D=outside diameter of the pipe, in inches
t=normal wall thickness, in inches.

The gap or gaps ("d" in FIG. 5) prevent the teeth of the gripping segments from engaging the outer surface of the male plastic pipe prematurely, i.e., until the gasket has been compressed enough to create the seal. As a result, the pipe seal is made before the teeth of the gripping segments contact the male pipe outer surface.

It will also be apparent to those skilled in the relevant art that the ring segments can be of various lengths with some segments having teeth and others being plain. In the case of a segmented ring, it is generally desirable to form a 360° ring on assembly to reduce hoop stress developed during the sealing function of the gasket and joint components. Contact between the ring segments sets up an interference or radial force component so that the device cannot be over tightened.

Figure 7:
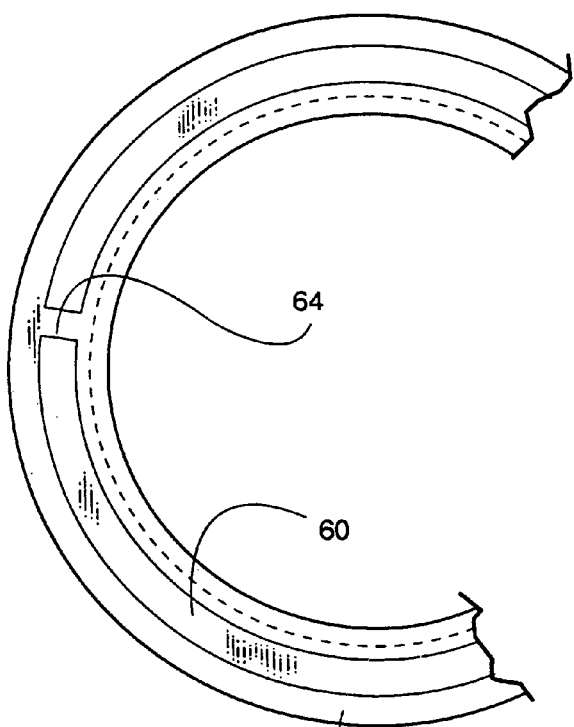
FIG. 7 is a view similar to FIG. 5, but illustrating another embodiment of the invention in which a single ring, slit at one circumferential location, is utilized.

FIG. 7 shows another embodiment of the invention in which a hardened ring 60 is located within the rubber gasket body 62. In this case, the ring 60 is a single piece ring having only a single slit 64 at one circumferential location to allow for expansion and contraction. In this embodiment of the invention, the hardened ring 60 preferably sits within a suitably formed "pocket" in the gasket body. This arrangement allows some movement of the hardened ring 60 within the pocket to allow for expansion and contraction, for example, to allow the gasket to slip over the male pipe end.

While the preferred gasket body is shown in FIG. 4 and 6 as being conical in cross section, it will be understood that other gasket body shapes can be envisioned such a plain O-ring, or modified O-ring cross section, or even a flanged gasket.

Figure 9:
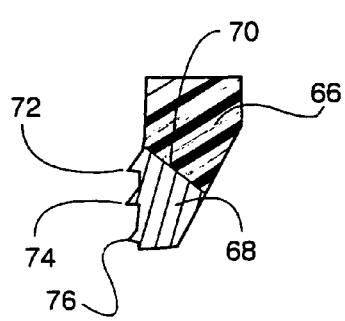
FIG. 9 is an alternative version of the self restrained gasket of the invention in which the gripper segments are exposed on a forward extent of the gasket body.
Figure 10:
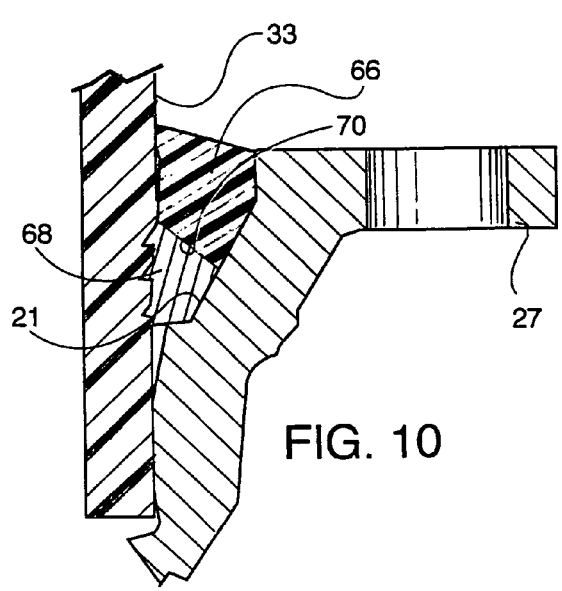
FIG. 10 is a horizontal sectional view of a pipe joint of the invention, with the joint being shown in the assembled condition and utilizing the embodiment of the self-restrained gasket of FIG. 9.

FIG. 9 shows another embodiment of the invention in which the elastomeric gasket body 66 carries a series of gripping segments 68 exposed at a forward extent 70 thereof. The gripping teeth are compressed by a gland fitting during the assembly of the pipe joint, as shown in FIG. 10. The gripping segments 68 may be provided with teeth of the same of different lengths. In the example of FIG. 9, the teeth are of different lengths, as follows:

Row 72—3/32 inch
Row 74—1/16 inch
Row 76—1/32 inch

Figure 11:
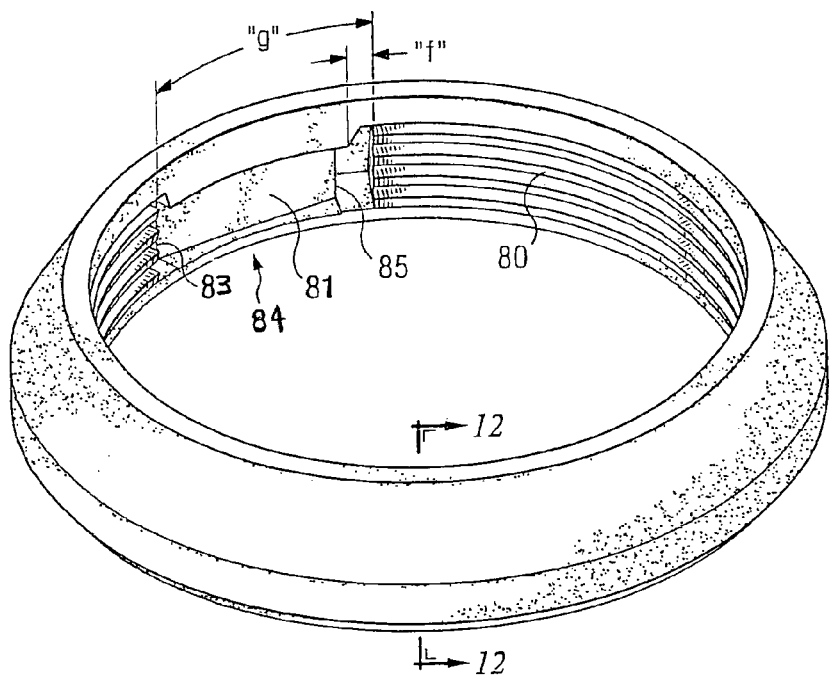
FIG. 11 is a perspective view of one embodiment of the invention in which the restraint mechanism is a solid ring having a gap at one circumferential location.
Figure 12:
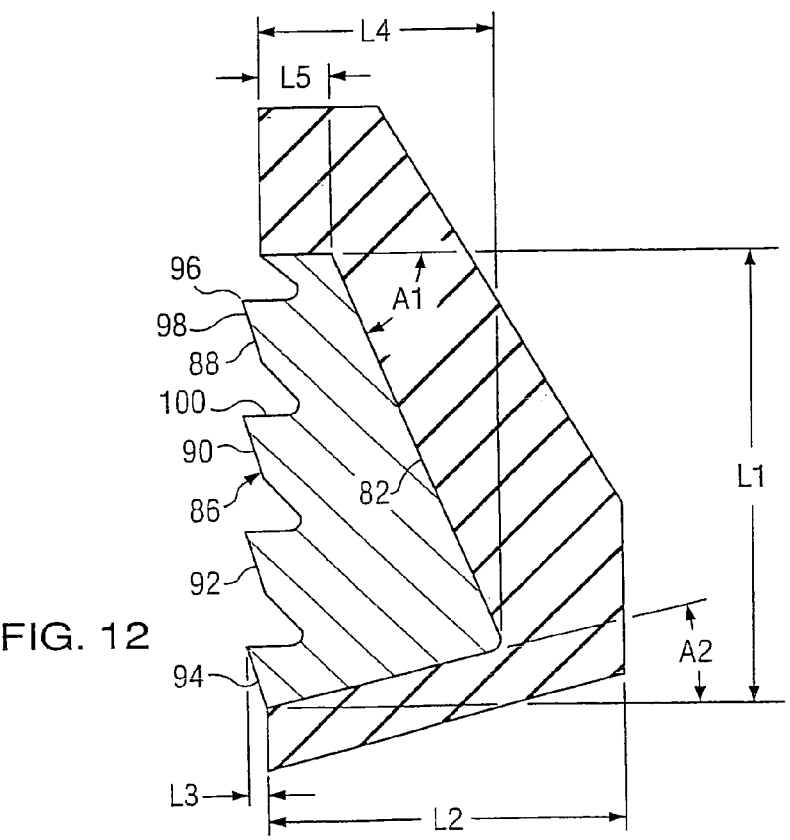
FIG. 12 is a cross sectional view taken along lines 12—12 in FIG. 11.

FIG. 11 is a perspective view of a version of the embodiment of the invention, similar to FIG. 7, in which a relatively rigid ring 80 is located within a recess or pocket (82 in FIG. 12). As viewed in cross section, the ring 80 is generally wedge shaped, increasing in width from the top to the bottom as viewed in FIG. 12. The relatively rigid ring can be formed of any suitable hard material such as cast iron or metal alloy such as copper, aluminum or stainless steel as well as various hardened polymers, ceramics, composite materials, and the like. Again, the ring 80 is a single piece ring having only a single slit or opening 84 at one circumferential location to allow for expansion and contraction. For example, the overall "gap", indicated by "g" in FIG. 11, allows the ring 80 to slip over the mating male pipe end during assembly of the pipe joint. The slit in the ring illustrated at 64 in FIG. 7 was relatively small, allowing the opposing faces of the ring to actually make interfering contact during assembly of the pipe joint. The overall gap "g" in FIG. 11, on the other hand, is relatively large and can vary on the order of 1/32 to 1/4 of the total inner circumferential area of the gasket body. The gap "g" is quite sizable in the embodiment of the invention shown in FIG. 1, comprising on the order of 1/8 of the total circumference of the gasket body. The larger gap distance requires ever greater pressure to push the gap toward a closed position during joint make up and ensures that the gasket body seals first prior to engagement of the gripping teeth to restrain the joint in position. The gap could be left "open", or could be filled with rubber, depending upon the end application of the restraining gasket. In the particular embodiment illustrated in FIG. 11, the gap "g" is filled with a mass of rubber 81 which has opposite end regions 83, 85 which are contacted by the opposing ring faces as the joint is assembled. The end regions 83, 85 are initially spaced apart from the opposing ring faces by a distance of about 1/4 to 3/8 inch for 4 inch to 12 inch diameter pipe.

As a result, a secondary gap ("f" in FIG. 11) exists between the opposing ring face and the opposite end regions (85 in FIG. 11) of the mass of rubber 81. It will be appreciated from FIG. 11 that, since the ring 80 sits in a "pocket" within the gasket body, that the opposing ring faces can be evenly spaced from the end regions of the mass of rubber 81 to, in effect, create two secondary gaps "f", or the ring can be pushed up against one of the rubber end regions 83, 85 so that one secondary gap "f" exists. Whether one or two gaps "f" exists, the overall secondary gap distance "f" is the same, i.e., about ¼ inch to ⅜ inch for a 4 inch to 12 inch diameter pipe.

The two gaps "f" and "g" cooperate in a two step process during assembly of the pipe joint. The first gap "g" allows the rigid ring 80 to slip over the mating male plastic pipe. The secondary gap "f" ensures the seal is effected prior to the rigid ring 80 engaging the exterior surface of the mating male plastic pipe. The rubber "partition" 81 also helps to prevent point loading and pipe distortion. During installation, the gasket is compressed by the mating gland fitting 31, i.e., by mechanical means. The secondary gap "f" is not closed until a proper seal is maintained by the elastomeric material of the gasket body.

As shown in FIG. 12, the inner circumferential surface 86 of the ring 80 has a plurality of circumferential rows of gripping teeth, in this case rows 88, 90, 92, 94. Each tooth, such as tooth 88 in FIG. 12, has an apex 96 and an inclined crest region 98 which, in turn, is joined to a cavity or trough region 100. The cavity or trough region 100 forms a reduction of inside contact area for the gripping teeth on the outer surface of the mating male pipe end during the make up of the pipe joint. The particular design of the gripping teeth, as shown in FIG. 12, helps to ensure that the sealing surfaces of the gasket body make contact with the mating male pipe surfaces first, followed by engagement of the gripping teeth to perform the restraining function. This action is critical in proper make up of the joint, since the reverse order of operation might stop the make up of the pipe sections prematurely, prior to proper sealing engagement.

With reference to FIG. 12, for a 6 inch sealing gasket, the relatively rigid ring has the following exemplary dimensions where the lengths are given in millimeters and the angles are given in degrees:

| Ring Material | L1 | L2 | L3 | L4 | L5 | A1 | A2 |
|---|---|---|---|---|---|---|---|
| Cast iron | 20.00 | 8.30 | 1.00 | 6.00 | 2.20 | 69.0 | 16.0 |

An invention has been provided with several advantages. The self-restrained pressure gasket of the invention is capable of joining and sealing the female bell pipe end of one pipe to a mating male spigot end of a second pipe. Because the ring segment/segments are either integrally molded within the annular gasket body or otherwise pre-positioned within a pocket or other location, the possibility of mistakes during field assembly are virtually eliminated. In either case, as internal pressure builds, the ring segment/segments supply more pressure to the exterior surface of the mating male spigot pipe end. This action helps to insure the integrity of the joint. Additionally, the hardened ring segment/segments aid in sealing the joint by keeping a constant gripping pressure at even the lowest operating pressure of the pipeline.

The teeth provided on the inner circumferential region of the ring segment/segments are oriented to allow movement of the male spigot end in a first longitudinal direction relative to the female belled end but to resist movement in a opposite longitudinal direction once the joint is assembled. The gaps provided between the hardened ring segment/segments prevent the teeth from engaging the male pipe exterior surface until the gasket is compressed enough to create a seal. Where the self-restrained pressure gasket is used as a part of a mechanical joint, a self-restraining joint is provided for joining plastic pipe to iron pipe which equals or exceeds the self-restraining and sealing capabilities of the prior art cast iron pipe systems.

While the invention has been shown in several different forms, it is not thus limited but is susceptible to various changes and modifications without departing from the spirit thereof.

I claim:

1. A self-restrained pressure gasket for insertion within a circumferential recess provided in a bell end opening of a first iron pipe capable of both joining and sealing the first pipe to a mating male plastic pipe having an interior surface and an exterior surface to create a sealed pipe joint, the gasket comprising:

an annular gasket body made of a resilient elastomeric material, the annular gasket body having an inner circumferential region and an outer circumferential region, the inner circumferential region having a circumferential recess located therein;

a relatively rigid ring located on the inner circumferential region of the gasket body within the circumferential recess of the gasket body, the ring having an inner circumferential surface, an outer circumferential surface and one opening at one circumferential location which creates one overall gap between opposing faces of the ring of a predetermined distance between the opposing faces when the gasket is in a relaxed state;

at least one row of gripping teeth located on the inner circumferential surface of the relatively rigid ring for engaging selected points on the exterior surface of the mating male plastic pipe;

wherein the overall gap between the opposing faces of the relatively rigid ring is at least partly filled with a mass of rubber having opposite end regions which form a rubber partition between the opposing faces of the ring and wherein the opposing faces of the relatively rigid ring are spaced apart from at least one of the rubber end regions by a secondary gap in a relaxed state prior to assembly of the pipe joint; and wherein the overall gap in the ring closes by a predetermined amount as the pipe joint is assembled, the distance between the opposing faces of the ring being selected to prevent the gripping teeth from engaging the exterior surface of the male plastic pipe prematurely before the gasket has been compressed enough to create a seal.

2. The self-restrained pressure gasket of claim 1, wherein the circumferential recess which is located in the elastomeric material of the inner circumferential region of the gasket body is sized to allow limited movement of the ring during expansion and contraction of the gasket, the inner circumferential surface of the ring being at least partly exposed from the material of the gasket body.

3. The self-restrained gasket of claim 2, wherein the ring can be removed and then re-installed within the circumferential recess in the inner circumferential region of the gasket body.

4. The self-restrained gasket of claim 2, wherein the ring is generally wedge shaped in cross section.

5. The self-restrained gasket of claim 1, wherein the predetermined distance between the opposing faces of the ring which creates the overall gap in the ring can vary from about 1/32 to about ¼ of the inner circumferential region of the gasket body.

6. The self-restrained gasket of claim 5, wherein the secondary gap is on the order of ¼ inch to ⅜ inch for 4 inch to 12 inch diameter mating male plastic pipe members.

7. The self-restrained gasket of claim 1, wherein the inner circumferential surface of the relatively rigid ring has a plurality of circumferential rows of gripping teeth and wherein each row of teeth forms an apex and an inclined crest region which, in turn, leads to a circumferential cavity which forms a reduction in inside contact area for the gripping teeth on the exterior surface of the mating male plastic pipe during make up of the pipe joint.

8. The self-restrained gasket of claim 7, wherein each circumferential cavity formed by each row of gripping teeth functions to ensure that sealing surfaces of the gasket body make contact with the mating male plastic pipe first, followed by engagement of the gripping teeth on the exterior surface of the mating male plastic pipe.

9. A pipe joint, comprising:
a female iron pipe having a bell end opening with a circumferential recess for receiving a sealing gasket, the bell end opening being sized to receive the spigot end of a mating male plastic pipe having an interior surface and an exterior surface, the female iron pipe also having an external flange formed thereon;
a self-restrained pressure gasket located within the circumferential recess provided in the bell end opening of the female iron pipe capable of both sealing the female iron pipe to the male plastic pipe and restraining the pipes in position, the gasket comprising:
an annular gasket body made of a resilient elastomeric material, the annular gasket body having an inner circumferential region and an outer circumferential region, the inner circumferential region having a circumferential recess located therein;
a relatively rigid ring located on the inner circumferential region of the gasket body within the circumferential recess of the gasket body, the ring having an inner circumferential surface, an outer circumferential surface and one opening at one circumferential location which creates one overall gap between opposing faces of the ring of a predetermined distance between the opposing faces when the gasket is in a relaxed state, the inner circumferential surface of the ring being at least partly exposed from the material of the gasket body;
at least one row of gripping teeth located on the inner circumferential surface of the ring for engaging selected points on the exterior surface of the mating male plastic pipe;
wherein the overall gap between the opposing faces of the relatively rigid ring is at least partly filled with a mass of rubber having opposite end regions which form a rubber partition between the opposing faces of the ring and wherein the opposing faces of the relatively rigid ring are spaced apart from at least one of the rubber end regions by a secondary gap in a relaxed state prior to assembly of the pipe joint;
wherein the overall gap in the ring closes by a predetermined amount as the pipe joint is assembled, the distance between the opposing faces of the ring being selected to prevent the gripping teeth from engaging the exterior surface of the male plastic pipe prematurely before the gasket has been compressed enough to create a seal; and
a circumferential gland fitting sized to be received about the exterior surface of the mating male plastic pipe for engaging the flange formed on the female iron pipe, the gland fitting having a forward lip region which contacts and compresses the gasket body as the joint is assembled.

10. The pipe joint of claim 9, wherein circumferential recess which is located in the elastomeric material of the inner circumferential region of the gasket body is sized to allow limited movement of the ring during expansion and contraction of the gasket.

11. The pipe joint of claim 10, wherein the ring can be removed and then re-installed within the circumferential recess in the inner circumferential region of the gasket body.

12. The pipe joint of claim 10, wherein the ring is generally wedge shaped in cross section.

13. The pipe joint of claim 9, wherein the predetermined distance between the opposing faces of the ring which creates the overall gap in the ring can vary from about $\frac{1}{32}$ to about $\frac{1}{4}$ of the inner circumferential region of the gasket body.

14. The pipe joint of claim 9, wherein the inner circumferential surface of the relatively rigid ring has a plurality of circumferential rows of gripping teeth and wherein each row of teeth forms an apex and an inclined crest region which, in turn, leads to a circumferential cavity which forms a reduction in inside contact area for the gripping teeth on the exterior surface of the mating male plastic pipe during make up of the pipe joint.

15. The pipe joint of claim 14, wherein each circumferential cavity formed by each row of gripping teeth functions to ensure that sealing surfaces of the gasket body make contact with the mating male plastic pipe first, followed by engagement of the gripping teeth on the exterior surface of the mating male plastic pipe.

* * * * *